United States Patent
Betton et al.

(10) Patent No.: US 9,790,293 B2
(45) Date of Patent: Oct. 17, 2017

(54) PROCESS FOR IMPROVING THE OPERATIONS OF A POLYMERISATION PLANT

(71) Applicant: INEOS EUROPE AG, Vaud (CH)

(72) Inventors: Fabrice Betton, Lyons (FR); Kevin Peter Ramsay, West Lothian (GB)

(73) Assignee: INEOS EUROPE AG, Vaud (CH)

( * ) Notice: Subject to any disclaimer, the term of this patent is extended or adjusted under 35 U.S.C. 154(b) by 322 days.

(21) Appl. No.: 14/428,758

(22) PCT Filed: Sep. 30, 2013

(86) PCT No.: PCT/EP2013/070343
§ 371 (c)(1),
(2) Date: Mar. 17, 2015

(87) PCT Pub. No.: WO2014/053443
PCT Pub. Date: Apr. 10, 2014

(65) Prior Publication Data
US 2015/0246981 A1    Sep. 3, 2015

(30) Foreign Application Priority Data

Oct. 2, 2012    (EP) .................................... 12186983

(51) Int. Cl.
*C08F 10/00*    (2006.01)
*C08J 11/02*    (2006.01)
(Continued)

(52) U.S. Cl.
CPC .............. *C08F 10/00* (2013.01); *B01J 19/24* (2013.01); *B01J 19/245* (2013.01); *C08J 11/02* (2013.01);
(Continued)

(58) Field of Classification Search
CPC .............. C08J 11/02; C08F 2/00; B01J 19/24
(Continued)

(56) References Cited

U.S. PATENT DOCUMENTS

2007/0117939 A1    5/2007 Iaccino et al.

FOREIGN PATENT DOCUMENTS

EP    1 886 985 B1    9/2009
WO    WO 2005/030811 A1    4/2005
(Continued)

OTHER PUBLICATIONS

Burdett, Ian; "New Innovations Drive Gas Phase PE Technology"; *Hydrocarbon Engineering*; pp. 67-76 (2008).

*Primary Examiner* — Fred M Teskin
(74) *Attorney, Agent, or Firm* — Nixon & Vanderhye P.C.

(57) ABSTRACT

Petrochemical complex containing an olefin monomer polymerization plant having at least one polymerization reactor and an optional degassing section. The polymerization reactor contains process hydrocarbons consisting of the monomer, the optional comonomer(s) and optionally at least one inert hydrocarbon diluent, together with aluminum containing compound(s). The polymerization plant includes liquid purge stream(s) which contain aluminum containing compounds and optionally polymer fines, together with accumulated hydrocarbons which are different from the process hydrocarbons and which are hydrocarbons containing at least 4 carbon atoms. The petrochemical complex also contains a multipurpose hydrocarbon treatment unit which separates the liquid purge stream(s) into one stream having substantially all of the aluminum containing compounds and optional polymer fines, and one stream containing the accumulated hydrocarbons. The petrochemical complex also contains an upgrading unit for the treatment of the accumu- (Continued)

lated hydrocarbons which also produces the fresh monomer and/or comonomer for the polymerization reaction.

23 Claims, 1 Drawing Sheet

(51) Int. Cl.
*C08F 2/00* (2006.01)
*B01J 19/24* (2006.01)
*C08F 110/02* (2006.01)
*C08F 210/16* (2006.01)

(52) U.S. Cl.
CPC ......... *B01J 2219/24* (2013.01); *C08F 110/02* (2013.01); *C08F 210/16* (2013.01)

(58) Field of Classification Search
USPC .............. 422/131; 526/70, 68; 585/329, 809
See application file for complete search history.

(56) References Cited

FOREIGN PATENT DOCUMENTS

| | | |
|---|---|---|
| WO | WO 2006/082007 A1 | 8/2006 |
| WO | WO 2009/126277 A2 | 10/2009 |
| WO | WO 2009/126277 A3 | 10/2009 |

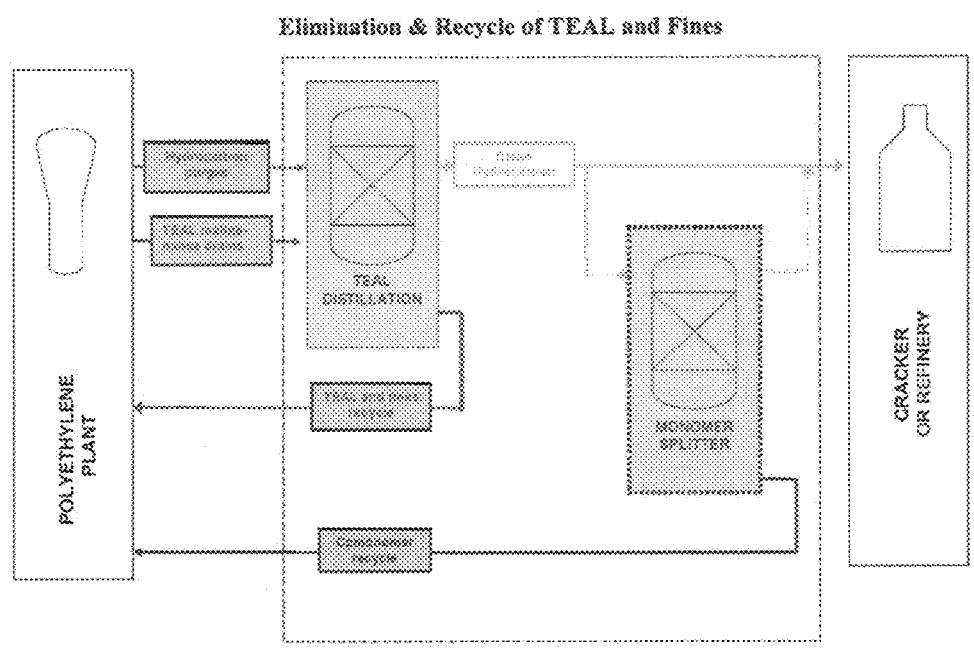

PROCESS FOR IMPROVING THE OPERATIONS OF A POLYMERISATION PLANT

This application is the U.S. national phase of International Application No. PCT/EP2013/070343 filed Sep. 30, 2013 which designated the U.S. and claims priority to European Patent Application No. 12186983.8 filed Oct. 2, 2012, the entire contents of each of which are hereby incorporated by reference.

The present invention relates to a process for improving the operations of a polymerisation plant which uses aluminium containing compound(s). In particular, the present invention relates to an environmentally improved petrochemical complex comprising at least one olefin monomer polymerisation plant, a hydrocarbon upgrading plant and an interconnected multipurpose hydrocarbon treatment unit, wherein the polymerisation plant uses aluminium containing compound(s).

BACKGROUND OF THE INVENTION AND SUMMARY OF THE INVENTION

The polymerisation reaction is usually operated in the presence of the monomer, the optional comonomer(s) and preferably an inert hydrocarbon diluent together with the catalyst system(s). Olefin monomer polymerisation plants comprise at least one reactor and at least one polymer powder degassing unit. The said degassing unit usually comprises degassing vessel(s) and a hydrocarbon recovery unit which itself usually comprises compressor(s), heat exchanger(s), knock-out drum(s) and pump(s); liquid purge stream(s) are also advantageously isolated in the said degassing unit(s). Liquid purge stream(s) may also originate directly from the polymerisation loop itself usually at specific locations where impurities and optionally liquids tend to accumulate. These impurities and liquids tend to affect the reaction design and operations (typically in a restricting manner) and also the degassing design and performance. The steady state concentration of these accumulated hydrocarbons thus needs to be maintained at an acceptable level whilst maximising the overall hydrocarbon (reagent/desired diluent) efficiency of the process. This is typically done through selection of optimised purge streams where the accumulated hydrocarbons concentration in the process is greatest (e.g. degassing section).

For the purpose of the present invention and appended claims, an acceptable level of accumulated hydrocarbons in the reactor is defined as a level above which its absorption on the polymer powder will overload the degassing capabilities of the degassing train; for example, the said concentration will either produce off-specification polymer material or force the operator to stop and/or idle the polymerisation operations.

For example, in a gas phase polymerisation process, a preferred acceptable level of accumulated hydrocarbons in the reactor can be the level for which the dew point of the gas in the reactor is lower than the polymerisation temperature, for example lower than the polymerisation temperature (Tpoly) minus a safety temperature margin (Tsm) [Tdew< (Tpoly−Tsm)]; said Tsm being greater than 2° C., preferably greater than 5° C., or even greater than 10° C.

Said liquid purge stream(s) essentially comprises the inert hydrocarbon together with the optional comonomer(s); additionally, the Applicants have identified that the said liquid purge stream(s) comprise(s) non negligible amounts of "other hydrocarbons" which could be detrimental if recycled to the polymerisation reactor. Said "other hydrocarbons" are produced by side reactions occurring in the course of the polymerisation (e.g. hydrogenation and/or oligomerisation reactions) and/or introduced into the polymerisation reaction as impurities of the (co)monomer(s) and/or inert hydrocarbon(s). The existing process characterise the said liquid purge stream(s) as waste streams, which usually implies its burning in either a flare or an incinerator burner. For example, in June 2008 "HydrocarbonEngineering" (http://www.univation.com/downloads/whitepapers/new_innovations_in_gas_phase_technology3.pdf), Dr. Ian Burdett states "Overall hydrocarbon losses from the system are very small, making recycle integration into olefin cracker unnecessary as well as uneconomical.". The Applicants have now demonstrated that it is possible to treat the said liquid purge stream(s) in an economical way whilst taking into due consideration the impact on the environment.

Environmental friendly developments are considered as critical for the Applicants. In the course of their continuous technology developments, the Applicants have identified that liquid purges coming from their polymerisation plants, e.g. from the degassing unit(s) and/or the polymerisation reactor loop, should be recovered instead of collected as waste streams and incinerated and/or flared. Attempts were made to recover said liquid purge streams and e.g. recycle it into the cracking plant and/or using it as a fuel (e.g. for steam generation). During the implementation of this development, the Applicants have unfortunately experienced critical efficiency problems during the operation of their hydrocarbon upgrading plant and/or burner.

Whilst not wishing to be bound to this theory, the Applicants found that these efficiency problems were generated by the presence of aluminium containing compounds and/or polymer fines which respectively created the poisoning of the cracking catalysis as well as fouling issues.

The objective of the present invention is therefore to develop a process which is environmentally friendly and which improves a safe recovery of valuable hydrocarbons in an olefin monomer polymerisation plant.

The objective of the present invention is also to develop a process for maintaining the level of accumulated inert in an olefin monomer at an acceptable level whilst treating the liquid purge stream(s) in an environmentally friendly way.

The objective of the present invention is also to develop a process which is environmentally friendly and which improves a safe recovery and/or recycle of valuable hydrocarbons in the course of operation of a petrochemical complex comprising an olefin monomer polymerisation plant and a hydrocarbon upgrading plant whilst ensuring efficient operations of the said upgrading plant.

US2007117939 discloses a process for polymerizing one or more monomers with a catalyst system and a fluorinated hydrocarbon diluent (a hydro fluorocarbon). A fluorinated hydrocarbon containing stream, a polymer product stream and a waste stream can be recovered from the mixture; and at least a portion of the waste stream is sent to a non-flare decomposition system to produce a destructed waste stream, and the destructed waste stream is released to atmosphere. US2007117939 does not recognize the issues encountered with the presence of aluminium containing compounds in the C4+ hydrocarbons (accumulated hydrocarbons).

WO2005030811 discloses a process for polymerizing an olefin and the corresponding comprising the steps of removing at least some of the unreacted olefin and corresponding alkane from the reaction zone, purging at least some of the alkane and recycling any remaining alkane and the unreacted olefin to the reaction zone. It also discloses in its FIG.

2 an integrated petrochemical complex comprising a syngas plant, a methanol plant, a methanol-to-propylene plant, and a polypropylene plant. WO2005030811 does not recognize the issues encountered with the presence of aluminium containing compounds in the C4+ hydrocarbons (accumulated hydrocarbons).

WO2006082007 discloses a process for the polymerization of ethylene or of ethylene with further 1-olefins, in which the ethylene is polymerized in the presence of a catalyst in a gas-phase reactor and reaction gas comprising propane and unpolymerized ethylene is circulated to remove the heat of polymerization, wherein the polymer particles are discharged from the reactor, the polymer particles are separated from the major part of the concomitantly discharged gas and the polymer particles are degassed, the gas is freed of entrained fine particles and is separated from a low-boiling fraction comprising ethylene or from a high boiling fraction containing further 1-olefins or alkanes having from 4 to 12 carbon atoms in a first separation stage, a propane fraction is separated off in a second separation stage and this propane fraction is used for degassing the polymer particles discharged from the reactor. WO2006082007 does not recognize the issues encountered with the presence of aluminium containing compounds in the C4+ hydrocarbons (accumulated hydrocarbons).

Thus, the present invention consists in a petrochemical complex comprising an olefin monomer polymerisation plant comprising at least one polymerisation reactor and an optional degassing section, wherein
  the polymerisation reactor comprises process hydrocarbons consisting of the monomer, the optional comonomer(s) and preferably at least one inert hydrocarbon diluent, together with aluminium containing compound(s); and
  the polymerisation plant comprises liquid purge stream(s) which comprises aluminium containing compounds and potentially polymer fines, together with accumulated hydrocarbons which are different from the said process hydrocarbons, characterised in that the petrochemical complex also comprises a multipurpose hydrocarbon treatment unit which separates the liquid purge stream(s) into
  one stream comprising substantially all of the aluminium containing compounds and potentially polymer fines, and
  one stream comprising the accumulated hydrocarbons.

The present invention also provides a process for the polymerisation of an olefin monomer, said process comprising the polymerisation of the monomer and the optional comonomer(s) preferably in the presence of at least one inert hydrocarbon diluent (the "process hydrocarbons") and at least one aluminium containing compound, said process comprising at least one liquid purge stream which comprises aluminium containing compounds and potentially polymer fines, together with accumulated hydrocarbons which are different from the said process hydrocarbons, characterised in that the liquid purge stream is separated into
  one stream comprising substantially all of the aluminium containing compounds and potentially polymer fines, and
  one stream comprising the accumulated hydrocarbons.

The present invention also provides a process for maintaining an acceptable level of accumulated inert hydrocarbons in the polymerisation reactor of an olefin monomer polymerisation plant process, said process comprising the polymerisation of the monomer and the optional comonomer(s) preferably in the presence of at least one inert hydrocarbon diluent (the "process hydrocarbons") and at least one aluminium containing compound, said process comprising at least one liquid purge stream which comprises aluminium containing compounds and potentially polymer fines, together with accumulated hydrocarbons which are different from the said process hydrocarbons, characterised in that the liquid purge stream is separated into
  one stream comprising substantially all of the aluminium containing compounds and potentially polymer fines, and
  one stream comprising the accumulated hydrocarbons.

In an alternative embodiment, the present invention consists in a petrochemical complex comprising an olefin monomer polymerisation plant and a hydrocarbon upgrading plant, the said polymerisation plant comprising at least one polymerisation reactor, wherein
  the polymerisation reactor comprises process hydrocarbons consisting of the monomer, the optional comonomer(s) and preferably at least one inert hydrocarbon diluent, together with aluminium containing compounds; and
  the polymerisation plant comprises at least one liquid purge stream which comprises aluminium containing compounds and potentially polymer fines, together with accumulated hydrocarbons which are different from the said process hydrocarbons, characterised in that the petrochemical complex also comprises an interconnected multipurpose hydrocarbon treatment unit which separates the liquid purge stream into
  one stream comprising substantially all of the aluminium containing compounds and potentially polymer fines, and
  one stream comprising the accumulated hydrocarbons which are recycled into the hydrocarbon upgrading plant.

The present invention also provides a process for operating a petrochemical complex comprising an olefin monomer polymerisation plant and a hydrocarbon upgrading plant, said process comprising the polymerisation in the polymerisation plant of the monomer and the optional comonomer(s) preferably in the presence of at least one inert hydrocarbon diluent (the "process hydrocarbons") and at least one aluminium containing compound, said process comprising at least one liquid purge stream from the polymerisation plant said liquid purge stream comprising aluminium containing compounds and potentially polymer fines, together with accumulated hydrocarbons which are different from the said process hydrocarbons, characterised in that the liquid purge stream is separated into
  one stream comprising substantially all of the aluminium containing compounds and potentially polymer fines, and
  one stream comprising the accumulated hydrocarbons which are recycled into the hydrocarbon upgrading plant.

BRIEF DESCRIPTION OF THE DRAWINGS

The invention is further described with reference to the accompanying drawings, in which:

FIG. 1 is a schematic drawing of an embodiment according to the present invention wherein the petrochemical complex comprises a polyethylene plant, a refinery cracker and an interconnected multipurpose hydrocarbon treatment unit.

DETAILED DESCRIPTION OF THE INVENTION

For the purpose of the present invention and appended claims, the accumulated hydrocarbons which are different from the said process hydrocarbons are produced by side reactions occurring in the course of the polymerisation (e.g. hydrogenation and/or oligomerisation reactions) and/or introduced into the polymerisation reaction as impurities (for example, impurities coming from the (co)monomer(s) feeds and/or inert hydrocarbon(s)). Examples of said accumulated hydrocarbons are butene-2, butane, hexene-2, hexane, octene-2, octane, n-hexane, n-octane, n-decane, etc. . . . . For the purpose of the present invention and appended claims, said accumulated hydrocarbons are C4+ hydrocarbons, i.e. hydrocarbons containing at least 4 carbon atoms.

These accumulated hydrocarbons can be continuously generated and recovered as liquid purge streams during the degassing stage and/or discontinuously recovered e.g. during emptying/cleaning of the corresponding degassing material (e.g. conveying pipes, knock-out drums, pumps, . . . ) for shutdown or maintenance; they can also come from the main polymerisation loop. They can also come from polymerisation reactor purges which control the amount of inert inside the said reactor.

The present invention allows separating said accumulated hydrocarbons from the aluminium containing compounds and preferably upgrading it in an upgrading plant which is preferably located in the same or nearby petrochemical complex as the polymerisation plant. Beyond the obvious environmental advantages, considerable amounts of these accumulated hydrocarbons can be upgraded into valuable products by applying the present invention. Furthermore, and this is an additional side advantages brought by the present invention, it is now possible thanks to this additional multipurpose separation unit to accept (co-)monomer feeds exhibiting a less stringent purity quality.

For the purpose of the present description and appended claims, the expression "one stream comprising the accumulated hydrocarbons" means preferably that all of the accumulated hydrocarbons will be comprised in the said stream which comes from the separation of the liquid purge stream(s). However, it will be obvious for the man skilled in the art that the exact percentage of accumulated hydrocarbons recovered will depend on the efficiency of the liquid purge separation stage. Thus the present invention also covers situations where lower ratios of accumulated hydrocarbons are recovered; for example, more than 90% by weight, preferably more than 95% by weight, more preferably more than 99% by weight, substantially all of the accumulated hydrocarbons are recovered during the separation stage.

For example, the liquid purge(s) according to the present invention may represent between 0.3 and 1.5 kg per ton of polymer. Thus, for a 400 KTPA polymerisation plant, it may represent quantities between 120 and 600 tons of liquid purges per year. Said quantities may even be multiplied when several polymerisation plants are connected to the multipurpose treatment unit of the present invention. The Applicants have unexpectedly found that they could recover at least 500 kilograms of aluminium containing compounds per year when applying the present invention to polymerisation plants having a capacity of at least 180 KTPA.

The initial aluminium containing compounds used in the present invention are usually the cocatalyst(s) of the catalytic system(s) used in the course of the polymerisation. Examples thereof are organoaluminium compounds, e.g. alkylated compounds with straight or branched alkyl chains comprising up to 20 carbon atoms, such as, for example trialkylaluminiums. Use may also be made of alkylmetal hydrides in which the alkyl radicals also comprise up to 20 carbon atoms, such as diisobutylaluminium hydride. Alkylmetal halides in which the alkyl radicals also comprise up to 20 carbon atoms, such as ethylaluminiumsesquichloride, diethylaluminium chloride and diisobutylaluminium chloride, are also suitable. Use may also be made of organoaluminium compounds obtained by reacting trialkylaluminiums or dialkylaluminium hydrides, the radicals of which comprise up to 20 carbon atoms, with diolefins comprising from 4 to 20 carbon atoms and more particularly the compounds known as isoprenylaluminiums. Trialkylaluminiums and in particular to those with straight alkyl chains comprising up to 18 carbon atoms, more particularly from 2 to 8 carbon atoms are most usual, especially triethylaluminium and triisobutylaluminium.

The aluminium containing compounds present in the liquid purge stream(s) of the present invention can be the same as the initial aluminium containing compounds and/or reaction products thereof, e.g. corresponding aluminium salts.

The aluminium containing compound may equally originate from cleaning treatments. For example, the charge powders could also be advantageously treated with alkylaluminium compounds, prior to polymerisation, in order to react with the water contained in the charge powder. The purification of the reactor can be carried out as indicated in European Patent Application EP-A-0180420. For example, the reactor may additionally be treated with an organoaluminium compound of the formula AlRn X3-n in which R is an alkyl group comprising from 2 to 12 carbon atoms, X is a hydrogen or halogen atom, or an alcoholate group, and n is a whole number or fraction comprised between 1 and 3. The organoaluminium compound, when used, may be chosen from amongst the trialkylaluminium compounds or hydrides, chlorides or alcoholates of alkylaluminium. Generally it is preferred to use a trialkylaluminium such as triethylaluminium, trisobutylaluminium, tri-n-hexyl-aluminium or tri-n-octyl aluminium. In certain cases, especially with a view to simplifying the process of the invention, the organoaluminium compound may advantageously be of the same nature as that used as co-catalyst associated with the catalyst in the catalyst system.

For the purpose of the present description and appended claims, the expression "one stream comprising substantially all of the aluminium containing compounds" means preferably that all of the aluminium containing compounds will be comprised in the said stream which comes from the separation of the liquid purge stream(s). However, it will be obvious for the man skilled in the art that the exact percentage of aluminium containing compounds recovered will depend on the efficiency of the liquid purge separation stage. Thus the present invention also covers situations where lower ratios of aluminium containing compounds are recovered; for example, more than 90% by weight, preferably more than 95% by weight, more preferably more than 99% by weight, substantially all of the aluminium containing compounds are recovered during the separation stage.

It will be obvious for the man skilled in the art that the wording "separation of the liquid purge stream into streams" is not restrictive towards the nature of the separated streams which can either be all gaseous, all liquids, or preferably some gaseous and other liquid.

The present invention may be applied to any suitable polymerisation catalyst, but is preferably applied to a process using a Ziegler-Natta type catalyst.

A Ziegler-Natta type catalyst is understood to mean a catalyst which comprises at least one transition metal chosen, for example, from titanium, vanadium, chromium, zirconium or hafnium. This catalyst can optionally comprise a magnesium halide, such as magnesium chloride or bromide, and/or a support based on a refractory oxide, such as silica or alumina. In particular a catalyst comprising titanium and/or vanadium, halogen and magnesium atoms can be used.

It is also possible to use a metallocene-based catalyst comprising at least one zirconium, titanium or hafnium atom, such as, for example, those described in EP 129368, U.S. Pat. No. 5,324,800 and EP 206794. It is also possible to use a catalyst containing a heteroatom bonded to a monocyclopentadienyl, such as, for example, the catalysts described in EP 416815 and EP 420436.

The catalyst is in principle used in conjunction with a cocatalyst which is an organometallic compound of a metal from Groups I to III of the Periodic Classification of the Elements, such as aluminium, boron, zinc or magnesium. For example, the cocatalyst can be an organoaluminium compound, such as a trialkylaluminium or an aluminoxane. Throughout the start-up period, the introduction of cocatalyst into the reactor is advantageously carried out so as to keep the cocatalyst to catalyst molar ratio constant. This ratio is preferably between 1 and 100. However, when a metallocene catalyst is used, this ratio can range from 1:10,000 to 10,000:1.

The catalyst can be used as is or optionally in the form of a prepolymer containing, for example, from 0.1 to 200 g, preferably from 10 to 100 g, of polymer per gram of transition metal. The process of the invention is particularly suited to the use of a non-prepolymerised catalyst.

The process can also be advantageously applied with a late transition metal catalyst, i. e. a metal from Groups VIIIb or Ib (Groups 8-11) of the Periodic Table. In particular the metals Fe, Co, Ni, Ru, Rh, Pd, Os, Ir, and Pt are preferred, especially Fe, Co and Ni. The late transition metal complex may comprise bidentate or tridentate ligands, preferably coordinated to the metal through nitrogen atoms. As examples are those complexes disclosed in WO96/23010. Suitable iron and/or cobalt complexes catalysts can also be found in WO98/27124 or in WO99/12981.

It is also possible to use a high-activity catalyst consisting essentially of a chromium oxide activated by a heat treatment and associated with a granular support based on a refractory oxide.

The multipurpose hydrocarbon treatment unit according to the present invention separates the liquid purge stream into
  one stream comprising substantially all of the aluminium containing compounds and potentially polymer fines, and
  one stream comprising the accumulated hydrocarbons which are preferably recycled into the hydrocarbon upgrading plant.

Whilst any appropriate separation unit could be used as hydrocarbon treatment unit, a distillation unit represents a preferred choice for the separation of the aluminium containing compounds from the accumulated hydrocarbons.

Said separation unit can be operated continuously or discontinuously.

As already mentioned above, the streams recovered after treatment in the separation unit can be in any state e.g. liquid, gaseous, or preferably liquid/gaseous. For the purpose of the present invention and appended claims, it is also obvious that the present invention covers situations where the liquid purges can be put under temperature and/or pressure conditions before separation such that the separation would be performed on e.g. a partly or fully gaseous stream.

The present invention has also proven to be advantageous either in the absence or during shut down operations of upgrading facilities. Indeed, the disposal of the said separated accumulated hydrocarbon e.g. through a flare or as a fuel gas is now improved compared to the past because there is much less fouling of the equipment, e.g. of the burner.

The upgrading plant can be any plant which performs the upgrading of the accumulated hydrocarbons into valuable products. For example, such upgrading plant can be a thermal oxidation unit and/or a boiler unit and/or a cracking unit. It can be located in a refinery or in the chemical complex either nearby or preferably where the polymerisation unit operates. According to an embodiment of the present invention, the accumulated hydrocarbons are upgraded into valuable products which comprise at least one of the monomer and/or comonomer contained in the process hydrocarbons; preferably, said monomer and/or comonomer are recycled together with the fresh monomer/comonomer into the polymerisation reactor. A preferred embodiment according to the present invention consists in using the cracking unit which produces the fresh monomer and/or comonomer for the polymerisation reactor as the upgrading unit for the accumulated hydrocarbons.

In an embodiment according to the present invention, at least some—or preferably all—of the separated aluminium compounds and/or potentially polymer fines are reintroduced into the polymerisation reactor or the polymerisation recycle loop.

In another embodiment of the present invention, at least some—or preferably all—of the separated aluminium compounds and/or potentially polymer fines are recovered and stored for a later use. Said embodiment is particularly valuable during the transition between incompatible polymerisation catalysts.

For the purpose of this patent specification and appended claims the term "incompatible catalysts" shall refer to and mean catalysts that satisfy one or more of the following:
1) those catalysts that when present together reduce the activity of at least one of the catalysts by greater than 50%;
2) those catalysts that under the same reactive conditions produce polymers such that one of the polymers has a molecular weight that is more than twice the molecular weight of the other polymer; and
3) those catalysts that differ in comonomer incorporation or reactivity ratio under the same conditions by more than about 30%.

Thus, an embodiment according to the present invention consists in a process for transitioning from a first polymerisation reaction in the presence of a first catalyst to a second polymerisation reaction in the presence of a second catalyst wherein the first and second catalysts are incompatible and wherein the first polymerisation reaction uses aluminium containing compounds—e.g. alkyl aluminium cocatalysts—characterised in that the liquid purge stream is separated into
  one stream comprising substantially all of the aluminium containing compounds and potentially polymer fines which are recovered and stored for a later use (e.g. a later polymerisation reaction in the presence of either the first catalyst and/or a similar catalyst), and
  one stream comprising the accumulated hydrocarbons.

The advantage of this particular embodiment is that the aluminium containing compounds of the first polymerisation reaction don't poison the catalyst of the second polymerisation reaction. For example, such embodiment is particularly useful when a polymerisation plant transitions from a Ziegler-Natta catalyst using an alkyl aluminium cocatalyst to a metallocenc catalysis and/or a chromium catalysis.

The liquid purges which are treated according to the present invention may also still comprise a non-negligible amount of process hydrocarbons, e.g. comonomer(s). In an additional embodiment according to the present invention, the said comonomer is also separated and recovered, and preferably recycled into the polymerisation process. This additional separation may either be performed in a dedicated additional separation unit which is preferably located downstream of the invention main separation unit, preferably on the separated accumulated hydrocarbons line—as depicted in FIG. 1—OR preferably integrated with the main separation unit, preferably in the same distillation unit which is designed in order to separate the liquid purges into
- one stream comprising substantially all of the aluminium containing compounds and potentially polymer fines,
- one stream comprising the accumulated hydrocarbons which are preferably recycled into the hydrocarbon upgrading plant, and
- one stream comprising process hydrocarbons, preferably the process comonomer, which is preferably recycled into the polymerisation process.

The polymerisation process according to the present invention can be a slurry phase process. A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 50° C. to 125° C. Loop reactors are widely used in slurry polymerisation processes. In a loop reactor the slurry is typically circulated in the reactor by means of a pump or agitator. Liquid full loop reactors are particularly well known in the art and are described for example in U.S. Pat. Nos. 3,152,872, 3,242,150 and 4,613,484. Additional references of slurry operations wherein the present invention can advantageously be used are WO2007138257 and WO2006056763. Loop slurry polymerisation is typically carried out at temperatures in the range 50-125° C. and at pressures in the range 1-100 bara. The product slurry, comprising polymer and diluent and in most cases also catalyst, olefin monomer and comonomer can be discharged intermittently or continuously.

The present invention is particularly useful in a continuous gas phase process for the polymerization, at a pressure from 10 to 500 psi, of a mixture comprising from 0 to 60 mole % hydrogen, from 0 to 35 mole % of one or more C3-8 alpha-olefins, from 15 to 100 mole % of ethylene and from 0 to 75 mole % of an inert gas such as N2 and/or one or more saturated hydrocarbons such as ethane, propane, butane, pentane and hexane (the inert hydrocarbon diluent for the purpose of the present description and appended claims), conducted at a temperature from 50 deg. C. to 125 deg. C., preferably less than 115 deg. C. in the presence of a catalyst and a co-catalyst as described above.

Generally, a monomer feed comprising at least ethylene and optionally one or more C3-8 alpha-olefins is fed to a gas phase fluidized bed or stirred bed reactor. The monomer mixture optionally together with hydrogen and/or an inert gas are fed to the fluidized bed. In a fluidized bed reactor, the velocity of the gas is sufficient to suspend the bed in the fluid flow of monomer and other components. In a stirred bed reactor mechanical agitation serves to help suspend the bed. Generally a fluid bed reactor is vertical and a stirred bed reactor is horizontal. Concurrently with the monomers a co-catalyst and a supported catalyst are fed to the bed. The monomer passing over the catalyst polymerizes on the catalyst and in the pores of the catalyst causing the particle to increase in size and to break. The resulting polymer particle continues to grow as it resides in the reactor. In a stirred tank reactor the bed is stirred to a discharge section and leaves the reactor. In a fluidized bed the reactor typically has a narrower section to keep the fluid (gas) velocity sufficiently high to fluidize the bed. There is an expanded zone at the top of the reactor to reduce the speed of the gas passing through the reactor so the polymer/catalyst particles fall back into the bed. The discharge is from the bed zone in the reactor.

In both the fluidized bed and stirred bed the polymer particles removed from the reactor are degassed to remove any volatile material and the resulting polymer (with entrained catalyst) may then be further treated (e.g. stabilizers added and pelletized if necessary).

In the reactor the gas phase typically comprises the monomers, a balance gas such as nitrogen, a molecular weight control agent such as hydrogen, and depending on the process possibly a condensable liquid (i.e. condensing mode such as disclosed in U.S. Pat. No. 4,543,399 issued Sep. 24, 1985 to Jenkins III et al.; U.S. Pat. No. 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffin et al., assigned to Exxon Chemical Patents, Inc.). Additional references of gas phase operations wherein the present invention can advantageously be used are WO9428032, WO2010037650 and international patent application number PCT/EP2011/070280.

The condensable liquid can be a condensable monomer, e.g. but-1-ene, hex-1-ene, 4-methylpent-1-ene, cyclooctene, 1-pentene or octene used as a comonomer, and/or an optional inert condensable liquid (the inert hydrocarbon diluent for the purpose of the present description and appended claims), e.g. inert hydrocarbon(s), such as C4-C8 alkane(s) or cycloalkane(s), particularly butane, pentane or hexane. The partial pressure of said condensable liquid under reaction conditions is preferably greater than 2 bars.

The present invention is advantageously used at very high Space Time Yields. The Space Time Yield ("STY") is expressed in [kg/(m3×h)] is well known and represents the weight of polymer produced per unit of time and per unit of reactor bed volume. STY equal or higher than 100 kg/(m3×h) and even 120 kg/(m3×h) are preferred.

The reactor mixture comprises from 0 to 60 mole % hydrogen, from 0 to 35 mole % of one or more C3-8 alpha-olefins, from 15 to 100 mole % of ethylene and from 0 to 75 mole % of an inert gas such as N2. Copolymerizable olefins include butene (1-butene), 4-methyl-1-pentene, pentene, hexene (1-hexene) and octene (1-octene), although it may be difficult to keep significant amounts of octene in the gas phase. The polymer may have a density from 0.905 to 0.965 g/cc, typically from about 0.910 to about 0.960 g/cc.

Fluidized bed gas phase reactors to make polyethylene are generally operated at temperatures from about 50 deg. C. up to about 125 deg. C. (provided the sticking temperature of the polymer is not exceeded) preferably from about 75 deg. C. to about 110 deg. C. and at pressures typically not exceeding 3,447 kPa (about 500 psi) preferably not greater than about 2,414 kPa (about 350 psi).

Polymerisation additives can also advantageously be added during the polymerisation process according to the present invention. Activity booster additives are preferred. For example, halogenated hydrocarbon compound can be advantageously introduced during the polymerisation in amounts effective for increasing the catalyst activity, the amount being preferably such that the molar of the quantity of the halogenated hydrocarbon compound to that of catalyst transition metal introduced into the polymerisation medium is greater than 0.001 and lower than 10. Said amount of halogenated hydrocarbon compound can also be advantageously controlled such that the molar ratio of the halogenated hydrocarbon compound to the cocatalyst is comprised between 0.03 and 0.2. The halogenated hydrocarbon compound can be a mono or a polyhalogenated saturated hydrocarbon and is preferably selected amongst the group consisting of methylene chloride, chloroform, carbon tetrachloride, trichloro-1,1,1 ethane and dichloro-1,2 ethane; monoalkyl chloride (R—Cl) like e.g. butyl chloride are preferably used. Examples thereof can be found in EP0703246, WO0228919 and EP1350802.

Typically the resulting polymer will comprise from 85 to 100 weight % of ethylene and from 0 to 15 weight % of one or more C3-8 alpha-olefins. The polymer should have a molecular weight (weight average, Mw) greater than 50,000 Da.

The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine light stabilizers (HALS); process aids such as fatty acids or their derivatives and fluoropolymers optionally in conjunction with low molecular weight esters of polyethylene glycol.

The present invention has been described in conjunction with specific embodiments thereof; the description cited above is intended to illustrate the present invention and not limit its scope. Additional aspects, advantages and modifications will be apparent to the man skilled in the art.

The following example is intended to give to the man skilled in the art a full disclosure and description of how to reproduce the invention, and is not intended to limit the scope of the present invention. Said example is represented by the schematically drawing FIG. 1.

It describes a petrochemical complex comprising a polyethylene plant, a refinery cracker (the hydrocarbon upgrading plant in this instance) and an interconnected multipurpose hydrocarbon treatment unit. The said unit is referred as the "TEAL distillation" unit (TEAL refers to triethylaluminium, i.e. one specific example of aluminium containing compound), e.g. a distillation column which allows separating the liquid purge stream(s) into
one stream comprising aluminium containing compounds and polymer fines, and
one stream comprising accumulated hydrocarbons.

Said liquid purge stream(s) are represented on FIG. 1 as the hydrocarbon purges (e.g. coming from the polymer degassing section—not shown on the figure) and the TEAL maintenance drains.

The separated aluminium containing compounds and the polymer fines are recycled into the polymerisation reactor.

The separated accumulated hydrocarbons ("clean hydrocarbon") are recycled into a hydrocarbon upgrading unit (cracker of refinery).

FIG. 1 also describes an optional embodiment according to the present invention which is particularly useful when the separated stream comprising the accumulated hydrocarbons also comprise a non-negligible amount of process hydrocarbons, e.g. comonomer(s). In such embodiment, the said valuable comonomer is also separated and recovered, and preferably recycled into the polymerisation process. This additional separation is thus performed in a dedicated additional separation unit ("monomer splitter column") which is located downstream of the invention main separation unit, as depicted in FIG. 1. In an alternative embodiment, said separation is preferably integrated with the main separation unit, preferably in the same distillation unit which is designed in order to separate the liquid purges.

The invention claimed is:

1. Petrochemical complex comprising an olefin monomer polymerisation plant comprising at least one polymerisation reactor and an optional degassing section, wherein
the polymerisation reactor comprises process hydrocarbons consisting of the monomer, the optional comonomer(s) and optionally at least one inert hydrocarbon diluent, together with aluminium containing compound(s); and
the polymerisation plant comprises liquid purge stream(s) which comprises aluminium containing compounds and optionally polymer fines, together with accumulated hydrocarbons which are different from the said process hydrocarbons and which are hydrocarbons containing at least 4 carbon atoms,
wherein the petrochemical complex also comprises a multipurpose hydrocarbon treatment unit which separates the liquid purge stream(s) into
one stream comprising substantially all of the aluminium containing compounds and optional polymer fines, and
one stream comprising the accumulated hydrocarbons; and
further wherein the petrochemical complex also comprises an upgrading unit for the treatment of the accumulated hydrocarbons which also produces the fresh monomer and/or comonomer for the polymerisation reaction.

2. Process for the polymerisation of an olefin monomer, said process comprising the polymerisation in the polymerisation reactor of an olefin monomer polymerisation plant of the monomer and the optional comonomer(s) optionally in the presence of at least one inert hydrocarbon diluent (the "process hydrocarbons") and at least one aluminium containing compound, said process comprising at least one liquid purge stream which comprises aluminium containing compounds and optionally polymer fines, together with accumulated hydrocarbons which are different from the said process hydrocarbons and which are hydrocarbons containing at least 4 carbon atoms,
wherein the liquid purge stream is separated into
one stream comprising substantially all of the aluminium containing compounds and optional polymer fines, and
one stream comprising the accumulated hydrocarbons.

3. Process according to claim 2 wherein the accumulated inert hydrocarbons are maintained below an acceptable level in the polymerisation reactor of the olefin monomer polymerisation plant, the acceptable level of accumulated hydrocarbons in the reactor being a level above which its absorption on the polymer powder will overload the degassing capabilities of the degassing section.

4. Petrochemical complex according to claim 1 further comprising a hydrocarbon upgrading plant which is a thermal oxidation unit and/or a boiler unit and/or a cracking unit, characterised in that the separated accumulated hydrocarbons are recycled into the said hydrocarbon upgrading plant.

5. Process according to claim 2 wherein the polymerisation plant is integrated in a petrochemical complex comprising a hydrocarbon upgrading plant which is a thermal oxidation unit and/or a boiler unit and/or a cracking unit, wherein the separated accumulated hydrocarbons are recycled into the hydrocarbon upgrading plant.

6. Complex according to claim 1 wherein the accumulated hydrocarbons are butene-2, butane, hexene-2, hexane, octene-2, octane, n-hexane, n-octane, or n-decane.

7. Complex according to claim 1 wherein the liquid purge(s) represent more than 0.3 kg per ton of polymer produced.

8. Complex according to claim 1 wherein at least 500 kilograms of aluminium containing compounds are recovered per year.

9. Complex according to claim 1 wherein the aluminium containing compounds are selected from organoaluminium compounds.

10. Complex according to claim 1 wherein the catalyst used in the polymerisation plant is a Ziegler-Natta type catalyst.

11. Complex according to claim 1 wherein the hydrocarbon treatment unit is a distillation unit.

12. Complex according to claim 1 wherein the liquid purges are separated into
one stream comprising substantially all of the aluminium containing compounds and optional polymer fines,
one stream comprising the accumulated hydrocarbons, and
one stream comprising process hydrocarbons.

13. Complex according to claim 1 wherein the accumulated hydrocarbons are upgraded into valuable products which comprise at least one of the monomer and/or comonomer contained in the process hydrocarbons.

14. Complex according to claim 1 wherein the upgrading unit for the treatment of the accumulated hydrocarbons is a cracking unit.

15. Process according to claim 2 wherein the accumulated hydrocarbons are butene-2, butane, hexene-2, hexane, octene-2, octane, n-hexane, n-octane, or n-decane.

16. Process according to claim 2 wherein the liquid purge(s) represent more than 0.3 kg per ton of polymer produced.

17. Process according to claim 2 wherein at least 500 kilograms of aluminium containing compounds are recovered per year.

18. Process according to claim 2 wherein the aluminium containing compounds are selected from organoaluminium compounds.

19. Process according to claim 2 wherein the catalyst used in the polymerisation plant is a Ziegler-Natta type catalyst.

20. Process according to claim 2 wherein the separation of the liquid purge stream takes place in a hydrocarbon treatment unit which is a distillation unit.

21. Process according to claim 2 wherein the liquid purges are separated into
one stream comprising substantially all of the aluminium containing compounds and optional polymer fines,
one stream comprising the accumulated hydrocarbons, and
one stream comprising process hydrocarbons.

22. Process according to claim 2 wherein the accumulated hydrocarbons are upgraded into valuable products which comprise at least one of the monomer and/or comonomer contained in the process hydrocarbons.

23. Process according to claim 2 wherein there is further provided an upgrading unit for the treatment of the accumulated hydrocarbons which upgrading unit also produces the fresh monomer and/or comonomer for the polymerisation reactor.

* * * * *